United States Patent
Ganacharya et al.

(10) Patent No.: US 9,871,807 B2
(45) Date of Patent: Jan. 16, 2018

(54) GENERIC PROTOCOL DECODER FOR GENERIC APPLICATION-LEVEL PROTOCOL SIGNATURES

(75) Inventors: Tanmay Arun Ganacharya, Kirkland, WA (US); Vladimir Lifliand, Sammamish, WA (US); Evgeney Ryzhyk, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 1408 days.

(21) Appl. No.: 12/483,332

(22) Filed: Jun. 12, 2009

(65) Prior Publication Data

US 2010/0319071 A1 Dec. 16, 2010

(51) Int. Cl.
*G06F 21/55* (2013.01)
*H04L 29/06* (2006.01)
*G06F 21/56* (2013.01)

(52) U.S. Cl.
CPC ........ *H04L 63/1416* (2013.01); *G06F 21/564* (2013.01); *H04L 69/22* (2013.01)

(58) Field of Classification Search
CPC .... G06F 21/564; H04L 69/22; H04L 63/1416
See application file for complete search history.

(56) References Cited

U.S. PATENT DOCUMENTS

| | | | |
|---|---|---|---|
| 5,796,942 A | 8/1998 | Esbensen | |
| 6,772,413 B2* | 8/2004 | Kuznetsov | 717/136 |
| 6,976,209 B1* | 12/2005 | Storisteanu et al. | 715/201 |
| 7,188,168 B1* | 3/2007 | Liao | 709/224 |
| 7,243,371 B1* | 7/2007 | Kasper et al. | 726/22 |
| 9,094,283 B2* | 7/2015 | Toilet | H04L 43/18 |
| 9,191,397 B2* | 11/2015 | Chinta | H04L 43/18 |
| 2002/0120854 A1* | 8/2002 | LeVine et al. | 713/189 |
| 2003/0014662 A1* | 1/2003 | Gupta | G06F 21/55 |
| | | | 726/23 |
| 2005/0238022 A1* | 10/2005 | Panigrahy | 370/392 |
| 2005/0273772 A1* | 12/2005 | Matsakis et al. | 717/136 |
| 2007/0058551 A1* | 3/2007 | Brusotti et al. | 370/241 |
| 2007/0112969 A1* | 5/2007 | Wang | G06F 11/3612 |
| | | | 709/230 |
| 2007/0133593 A1* | 6/2007 | Shankara | 370/463 |

(Continued)

OTHER PUBLICATIONS

Nabil Schear et al., High-speed Matching of Vulnerability Signatures, http://www.hatswitch.orgh/~nikita/papers/vespa-raid08.pdf, Department of Electrical and Computer Engineering University of Illinois at Urbana-Champaign, RAID '08 Proceedings of the 11th international symposium on Recent Advances in Intrusion Detection, pp. 155-174.*

(Continued)

*Primary Examiner* — Michael R Vaughan

(57) ABSTRACT

Described is a generic protocol decoder that analyzes network traffic or file data to look for a signature, and signals an intrusion prevention mechanism/system if the signature is matched. In one aspect, the generic decoder is built using generic application-level protocol analysis language (GAPAL) primitives. These primitives provide various capabilities, including pattern matching, skipping, reading data, copying variable data and comparing data. The generic decoder may be coupled to a pre-developed protocol parser that provides the decoder with the data to analyze.

23 Claims, 5 Drawing Sheets

(56) References Cited

U.S. PATENT DOCUMENTS

| | | | |
|---|---|---|---|
| 2008/0050469 A1* | 2/2008 | Kwon et al. .................... | 426/23 |
| 2008/0052780 A1* | 2/2008 | Cao ...................... | G06F 21/554 |
| | | | 726/23 |
| 2008/0133518 A1* | 6/2008 | Kapoor .................. | G06F 9/505 |
| 2009/0013408 A1* | 1/2009 | Schipka ......................... | 726/24 |
| 2009/0070459 A1* | 3/2009 | Cho et al. .................... | 709/224 |
| 2009/0328011 A1 | 12/2009 | Lifliand et al. | |
| 2010/0322266 A1* | 12/2010 | Kropp ................. | H04L 45/7453 |
| | | | 370/469 |
| 2011/0030057 A1* | 2/2011 | Chen .................. | H04L 63/1416 |
| | | | 726/23 |

OTHER PUBLICATIONS

Tellenbach, et al."Towards Automated Exploit Signature Generation Using Honeypots", Retrieved at<<ftp://www.tik.ee.ethz.ch/pub/students/2007-So/MA-2007-09.pdf>>, Mar. 2007 to Sep. 2007, pp. 98.

Borisov, et al."A Generic Application-Level Protocol Analyzer and its Language", Retrieved at<<http://www.cs.berkeley.edu/~pallavi/papers/GAPA.pdf>>, pp. 13.

Cui, et al."Discoverer: Automatic Protocol Reverse Engineering from Network Traces", Retrieved at<<http://research.microsoft.com/en-us/um/people/helenw/papers/discoverer-html/discoverer-html/>>, pp. 19.

Schear, et al."High-speed Matching of Vulnerability Signatures", Retrieved at<<http://www.hatswitch.org/~nikita/papers/vespa-raid08.pdf>>, pp. 1-20.

\* cited by examiner

GENERIC PROTOCOL DECODER FOR GENERIC APPLICATION-LEVEL PROTOCOL SIGNATURES

BACKGROUND

To protect against malicious content, intrusion prevention systems (and similarly intrusion detection systems) use an engine to detect signatures of known malicious content. To detect such content, the various communication protocols on the network need to be understood and modeled.

In some situations, such malicious content can be found in a network protocol for which a protocol decoder has already been developed. In these situations it is relatively easy for a response team to quickly respond to a threat by writing a signature that checks appropriate conditions in the parsed protocol.

However, if such a protocol decoder is not available, the response team is not be able to release a signature quickly, because developing the protocol decoder, testing it and then writing a signature takes a relatively long time. Indeed, the amount of time that it takes will likely make any response too late to be of much use.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which content comprising a subset of data within a larger set of data (e.g., a portion of data within network traffic or file content) is passed and analyzed for a signature by a generic decoder that is built using primitives, e.g., generic application-level protocol analysis language (GAPAL) primitives. The generic decoder signals an intrusion prevention mechanism/system if the signature is matched.

In one aspect, the various primitives include a primitive configured for pattern matching, a primitive configured for skipping a number of bytes to search for a pattern, a primitive configured for specifying a window in which at least one pattern is to be searched, a primitive configured for using a regular expression for pattern matching, a primitive configured for reading a value and moving within the set of data based on that value, a primitive configured for reading data to compare against a value, and/or a primitive configured for reading data and converting the data to required data types to compare against a threshold. Other capabilities of the generic protocol decoder include storing variable data, branching through regular expressions and directed parsing.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a generic protocol decoder that can be quickly built to parse for a discovered vulnerability. To this end, the generic protocol decoder can analyze appropriate part or parts of content corresponding to protocol features and/or file content via various pattern matching, byte skipping, comparison and other capabilities. If a signature corresponding to malicious content is detected, the generic protocol decoder signals a match for use by an intrusion prevention system.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and search technology in general.

Figure 1:
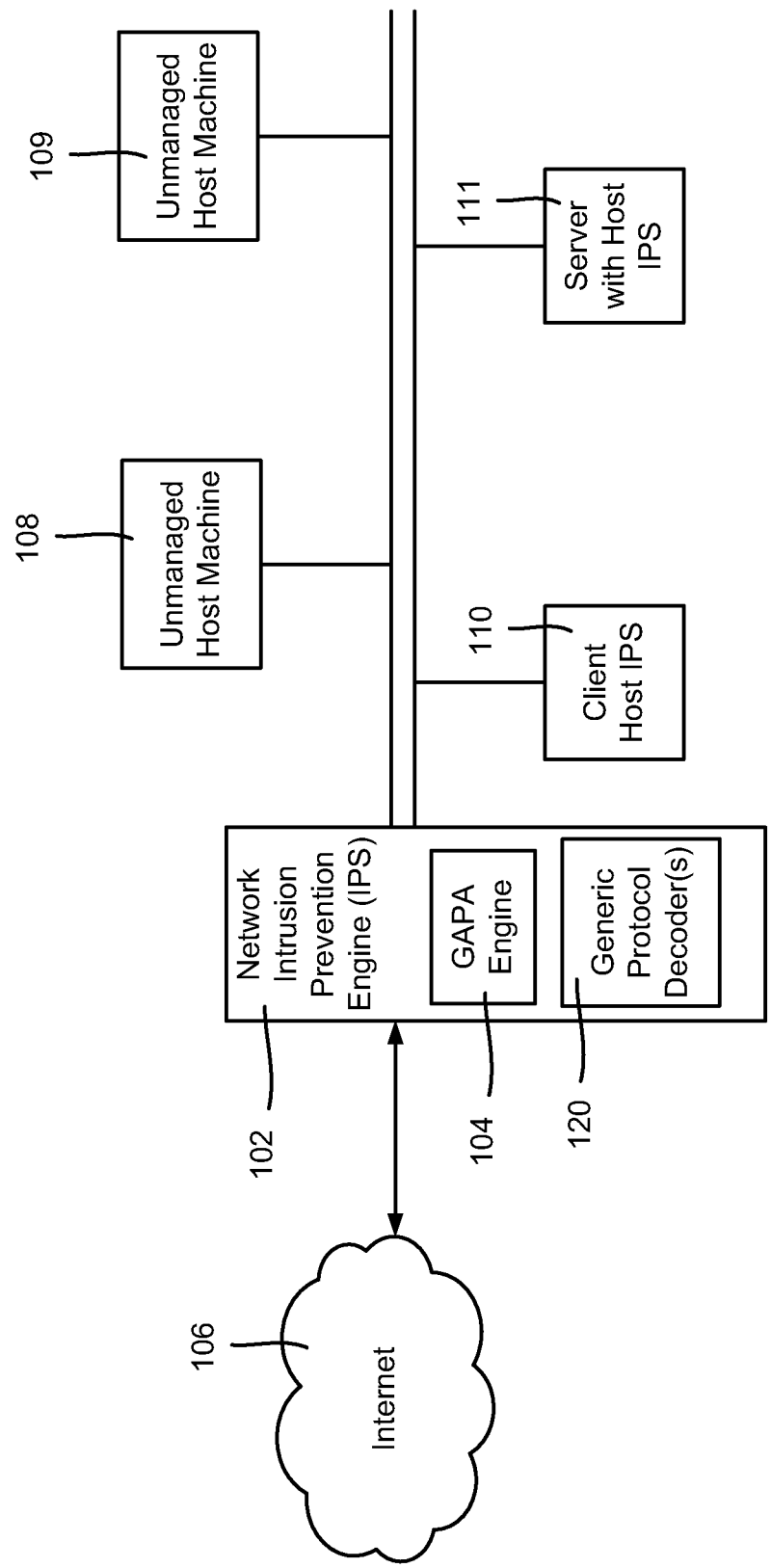
FIG. 1 is a block diagram representing an example environment in which a network intrusion prevention system including a generic application-level protocol analyzer engine and protocol decoder, evaluates network traffic, including file content, for signatures.

Turning to FIG. 1, there is shown an intrusion prevention system/mechanism (including an engine) 102 that is based on a generic application level protocol analyzer (GAPA) 104. Note that as used herein, "intrusion prevention" is equivalent to "intrusion detection" for purposes of brevity in this description. Further, note that any machine in the network, e.g., server or client, may also host an intrusion prevention system that uses the technology described herein. Thus, a network may have unmanaged host machines (e.g., 108 and 109), one or more clients (e.g., 110) and/or servers (e.g., 111) that host an intrusion prevention system.

In general, as described in U.S. patent application publication no. 20070112969, and U.S. patent application Ser. Nos. 12/146,935 and 12/147,895 (all of which are hereby incorporated by reference), the generic application-level protocol analyzer 104, which includes a protocol analysis language (GAPAL) and an analysis engine (the GAPAL run-time), operates on live network streams or traces and allows creation of new protocol analyzers that are both memory-safe and DoS (denial of service)-resilient. To support creation, the language provides built-in abstractions for message parsing, protocol state machines, session dispatching, and layering. GAPAL's message parsing supports text and binary messages with a BNF-like syntax.

Parsing operations are performed by the generic application level protocol analyzer 104 based on provided data; the analyzer 104 uses the data to detect matching tokens based on network traffic to and/or from the Internet 106. By way of example, the analyzer 104 may communicate with some logic to determine that a comma token is to be detected, and when detected, may communicate again to determine that two consecutive slash characters should next be detected, and so on. The logic may be more complex than simply providing a next expression set to match, but in general, the analyzer 104 parses and/or matches data as directed by the logic. Also, the analyzer 104 provides an API for coupled logic to get and set variables, and/or specify that part of the network traffic is to be buffered, e.g., rather than simply having the analyzer discard data (e.g., characters) that are not matches with the expression currently specified by the logic.

It is not practical to develop parsers for all existing protocols in advance. For example, development of each parser requires an approximately one month effort. At the same time, there are hundreds of protocols used in modern systems, with new ones frequently added.

Described herein is a generic protocol decoder 120 that in one implementation leverages the existing GAPAL language that is used to express protocol parsers. Each generic protocol decoder includes a number of capabilities, which in one embodiment is implemented through GAPAL primitives. Moreover, the decoder may process generic protocols using the same syntax that applies to protocol parsing.

One such capability is pattern matching, in which the decoder searches for specific content through packet payload with regular expression primitive. For example:

A→".*PATTERN";

Another capability provides the ability to specify where to start searching for a given pattern by skipping (moving) a number of bytes prior to a regular expression. For example:

A→byte<100>"PATTERN";

Another capability provides the ability to specify a window of bytes in which patterns are to be searched. This can be accomplished by providing an alternative non-greedy regular expression that will be matched only if the primary pattern is longer than specified. For example:

A→[nongreedy] ".*PATTERN"|[nongreedy] ".{100}";

A generic protocol decoder 120 also has the ability to use regular expressions for pattern matches. For example:

A→".*(abc){8}";

Yet another capability is the ability to read bytes from the packet payload and skip that many bytes before applying the next pattern. This can be implemented by storing the size in a variable and using this variable to indicate the size of an array. For example:

A→size:uint32 byte<size>;

A generic protocol decoder 120 also has the ability to read bytes and convert them to required data types to compare against a threshold. For example:

A→x:"[0-9]+" {% if(x.ParseNumber( )>382) . . . %};

Generic protocol decoders provide support for branches through regular expressions or directed parsing. For example:

A→"PATTERN1" B|"PATTERN2" C

The generic protocol decoder 120 works with the GAPA engine 104 that tokenizes the input stream, triggering a protocol state machine after each token is detected. The generic protocol decoder 120 also works with protocol parsers of the GAPA engine 104.

The primary difference between a protocol parser and a generic protocol decoder is handing of parse errors. If, for example, a protocol parser expects character A or character B at some point and character C is actually encountered, the GAPA Engine 104 concludes that the traffic does not conform to the protocol definition and issues a parse error. Conversely, in such a situation the generic protocol decoder indicates that the signature does not apply to the traffic, and does not provide a parse error.

While protocol parser and generic protocol decoder thus represent different approaches, in many situations a combined approach is preferable. One example is to use a generic protocol decoder to analyze some part of a protocol that is not handled by a protocol parser. In these situations, layering can be used to separate the part of the protocol handled by a protocol parser and the part of the protocol handled by a generic protocol decoder.

By way of example, analyzing file formats is one task for which generic protocol decoders are well suited. There are significantly more file formats than network protocols, and file formats are usually richer. As a result, generic protocol decoders may be implemented for file formats. To this end, in one implementation, the generic protocol decoder handles the analysis of the appropriate content type corresponding to a file extension.

Figure 2:
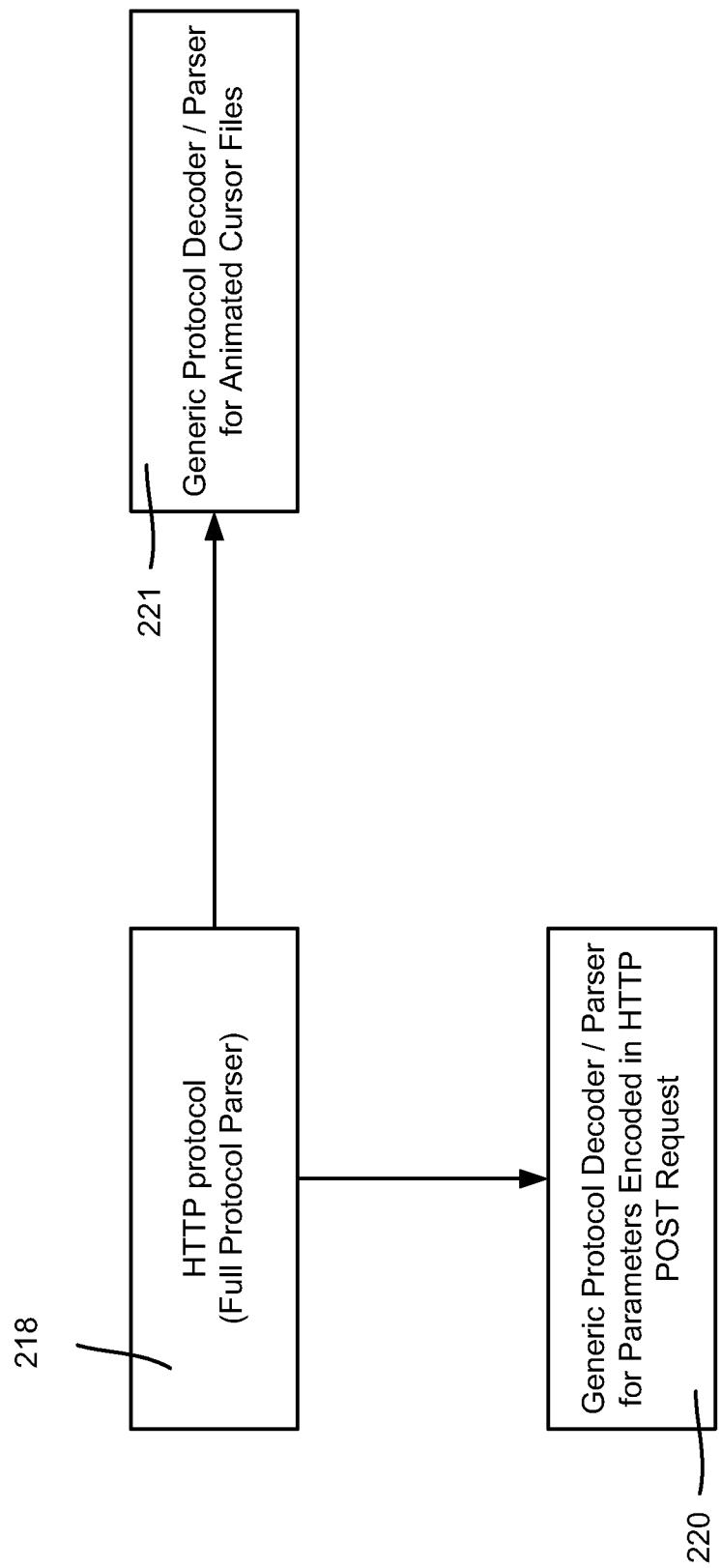
FIG. 2 is a block diagram representing an example of how a pre-developed protocol parser may be used in conjunction with generic protocol decoders to analyze network traffic.

FIG. 2 is an example that illustrates a combined approach involving a chained full protocol parser 218 and generic protocol decoders 220 and 221. As can be seen, the full protocol parser 218 parses HTTP, with HTTP POST requests analyzed by the generic protocol decoder 220 to evaluate whether the HTTP POST parameters are appropriate, e.g., do not match a malicious signature. When the content corresponds to an animated cursor file (e.g., with a .ANI extension), the generic protocol decoder 221 for animated cursor files is invoked to analyze the file.

Figure 3A:
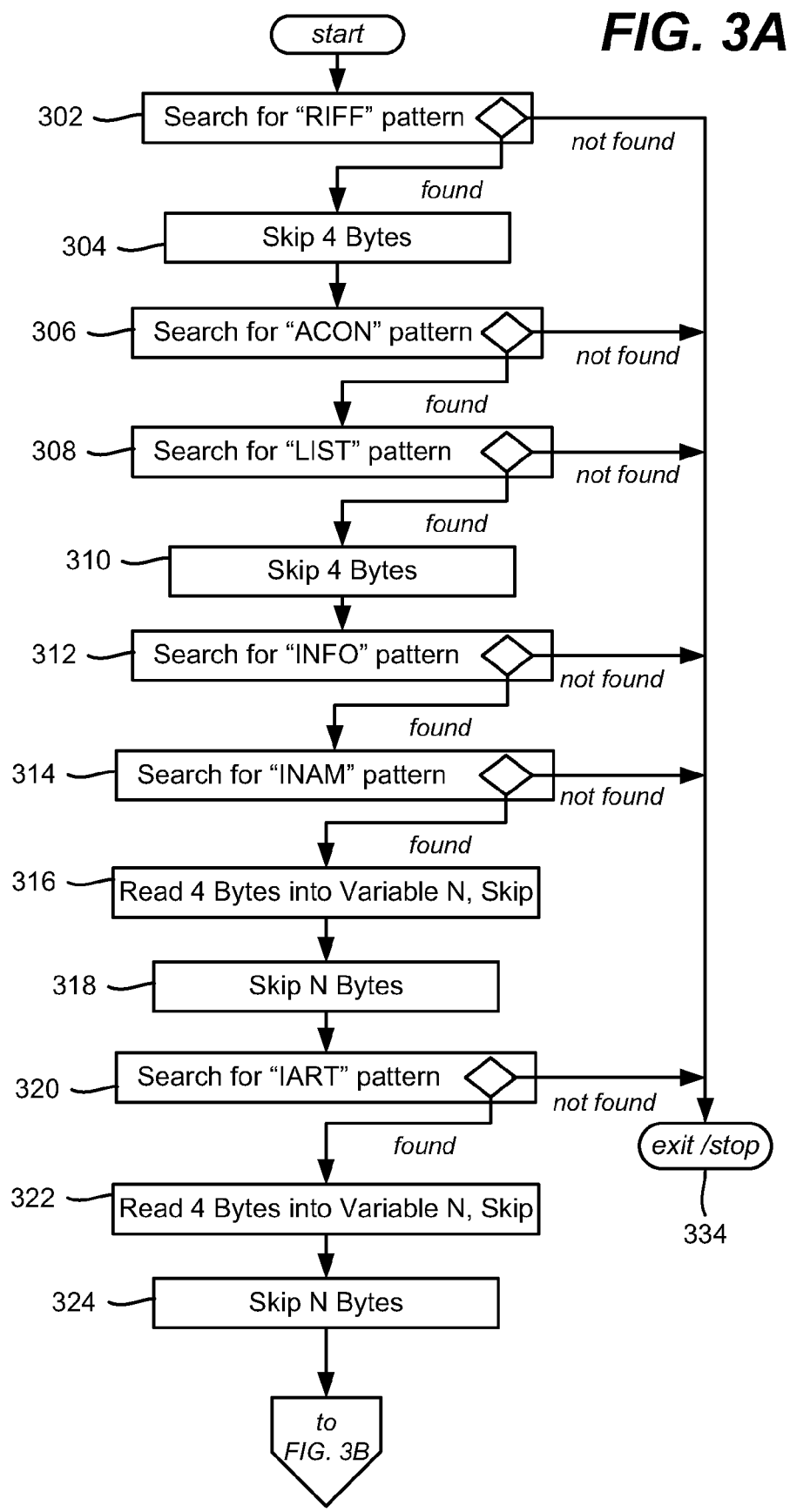
FIGS. 3A and 3B comprise a flow diagram exemplifying steps of a generic protocol decoder that parses and evaluates file content for a vulnerability in an example type of file.
Figure 3B:
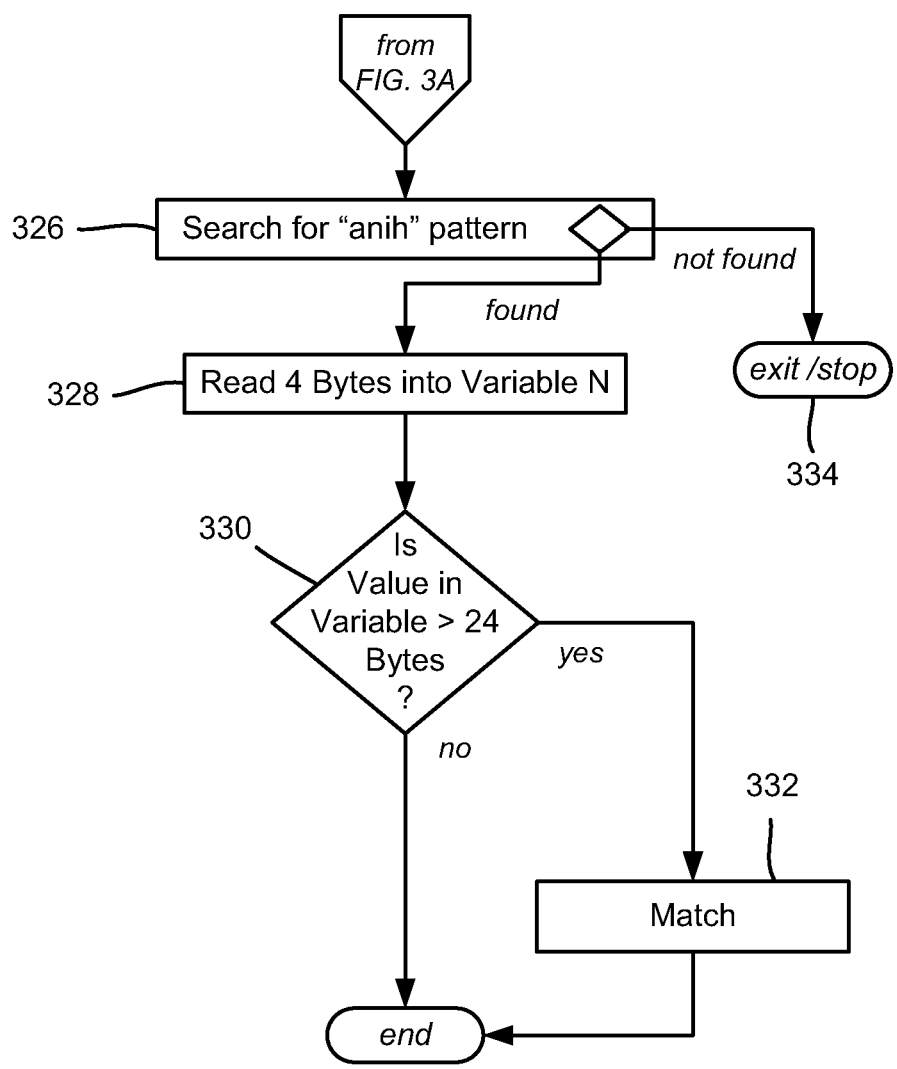

More particularly, the following table, along with FIGS. 3A and 3B, illustrate an example generic protocol decoder for an .ANI file. While it is possible to write a full protocol parser for a .ANI file, a response team can much more rapidly develop a generic protocol decoder for .ANI files, e.g., as demonstrated below, that only parses the needed fields.

```
protocol GenericParserMaliciousANI
{
  set id = {bdf82951-d96a-446e-8c25-6d7f254e0b25};
  set parentid = TCP;
  set ignorereparseerrors = "on";
  set ContentCategory = "FileName,[.](?i)ani(?-i)$";
    //Associates protocol parser with ANI files
  set SignatureId = "{355eb708-9b7a-4803-880a-07766bde4cae}";
  grammar
  {
    MaliciousANIFile ->
      "RIFF"
          //Matches pattern "RIFF" at the start of the file, step 302
      lengthOfFile:uint32host   // 4 bytes to skip, step 304
      "ACON"   // matches pattern, step 306
      "LIST"   // matches pattern, step 308
      lengthOfList:uint32host // 4 bytes to skip, step 310
      "INFO"   // matches pattern, step 312
      "INAM"   // matches pattern, step 314
      lengthOfTitle:uint32host
          //Skips 4 bytes and copies them into a variable, step 316
      uint8<lengthOfTitle.Value( )>
         // step 318 uses read value in variable to skip those many bytes
      "IART"   // matches pattern, step 320
      lengthOfAuthor:uint32host
          //Skips 4 bytes and copies them into a variable, step 322
      uint8<lengthOfAuthor.Value( )>
         // step 324 uses read value in variable to skip those many bytes
      "anih"   // matches pattern, step 326
      lengthOfAnimation:uint32host
          //Skips 4 bytes and copies them into a variable (step 328)
      {%
        if(lengthOfAnimation.Value( ) > 0x24)
           // step 330 uses read value to compare against threshold
        {
            GapaSignatureMatch( );
                //Malicious ANI file found (step 330)
        }
        GapaParseError( ); (step 334)
      %};
  }
}
```

In general, the above decoder looks for a vulnerability in .ANI files in which an animation value exceeds 24 bytes. As can be seen in the above code and in FIGS. 3A and 3B, the various capabilities of the generic protocol decoder, including pattern matching, reading and storing, skipping and comparing are leveraged to analyze file content, which in this example was a .ANI file. Patterns within the ANI file are matched, causing an error if any pattern is not properly matched. Further, the decoder is able to quickly skip to the patterns, and ultimately to the animation value's length to see if the vulnerability is present.

Exemplary Operating Environment

Figure 4:
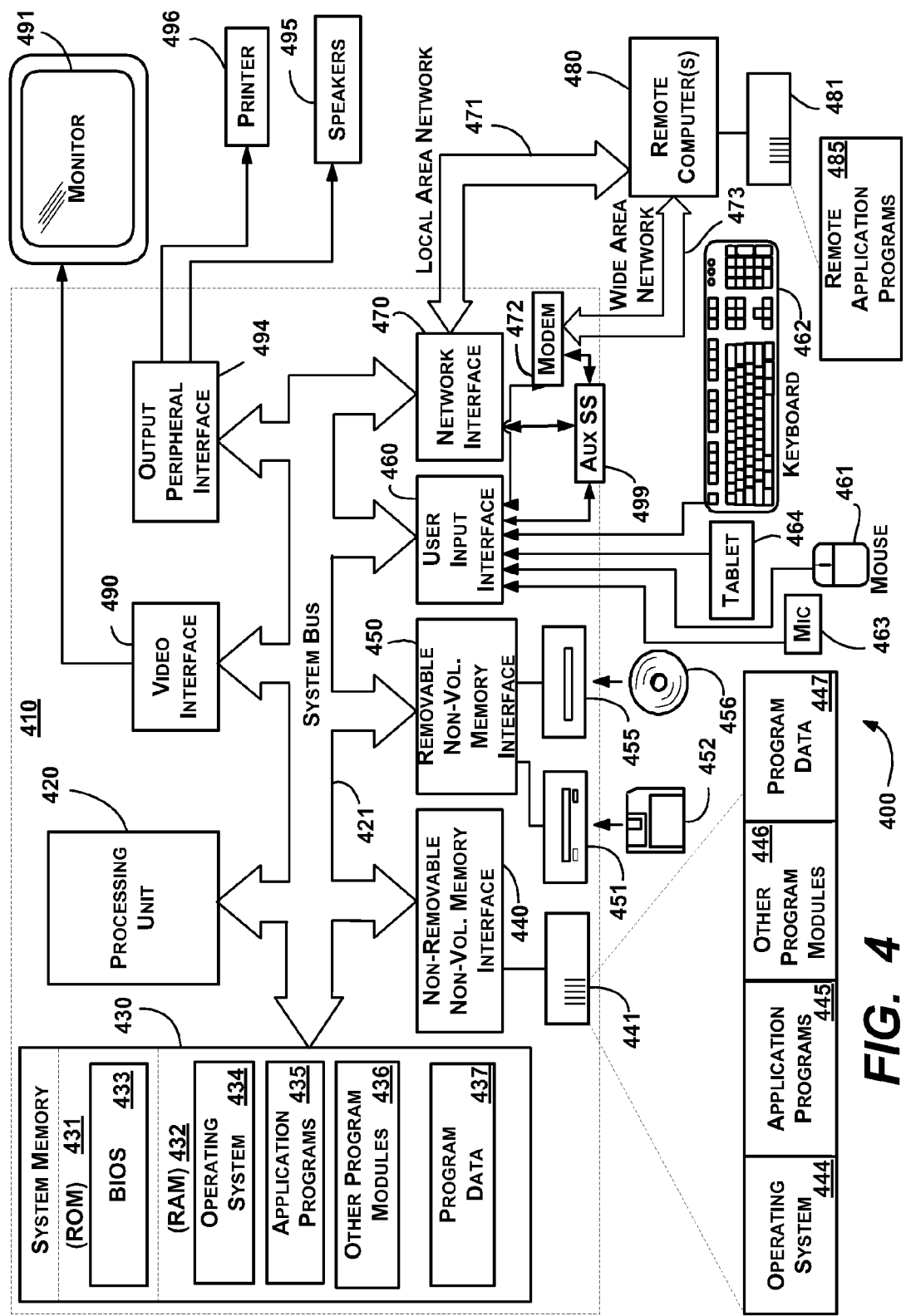
FIG. 4 shows an illustrative example of a computing environment into which various aspects of the present invention may be incorporated.

FIG. 4 illustrates an example of a suitable computing and networking environment 400 into which the examples and implementations of any of FIGS. 1-3B may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. A system comprising:
   at least one processor;
   a memory; and
   an intrusion prevention mechanism stored in the memory and including instructions, which are executable by the at least one processor and include
      an analysis engine configured to
         tokenize an input stream of data into a plurality of parts including a first one or more parts and a second one or more parts, and
         select the first one or more parts for analysis, wherein the analysis engine includes one or more protocol parsers, and wherein the one or more protocol parsers analyze the first one or more parts, and
      a generic decoder configured to operate based on generic application-level protocol analysis language primitives, wherein the generic decoder is configured to
         assist the one or more protocol parsers of the analysis engine by analyzing the second one or more parts, having a same protocol as the first one or more parts and not analyzed by the analysis engine, for a signature, wherein the analyzing of the second one or more parts includes searching the second one or more parts for a first predetermined pattern, and
         generate an error signal in response to matching the first predetermined pattern in the second one or more parts, wherein the signature is detected in response to the pattern being matched in the second one or more parts, and
   wherein the primitives include at least one of a primitive configured for pattern matching, a primitive configured for skipping a first predetermined number of bytes to search for the first predetermined pattern, a primitive configured for specifying a window in which at least one pattern is to be searched, a primitive configured for using a regular expression for pattern matching, or a primitive configured for reading a value and moving within the first one or more parts based on that value.

2. The system of claim 1, wherein:
   the primitives include generic application-level protocol analysis language primitives;
   the generic decoder uses a syntax that also applies to protocol parsing; or
   both the primitives include generic application-level protocol analysis language primitives and the generic decoder uses the syntax that also applies to protocol parsing.

3. The system of claim 1, wherein the first one or more parts comprises a portion of data within network traffic.

4. The system of claim 1, wherein the first one or more parts comprises file content within a file.

5. The system of claim 1, wherein the generic decoder is further configured to indicate that the signature does not apply to the input stream in response to encountering an unexpected token.

6. The system of claim 1, wherein the primitive configured for skipping the first predetermined number of bytes to search for the first predetermined pattern is configured to store a size of an array as a variable and use the variable to indicate the first predetermined number of bytes to skip.

7. The system of claim 1, wherein the primitive configured for specifying the window in which the at least one pattern is to be searched provides an alternative non-greedy regular expression that is matched only in response to a primary pattern being no longer than specified.

8. The system of claim 1, wherein the generic decoder is further configured to analyze one of the plurality of parts having a predetermined file format and corresponding file extension.

9. The system of claim 1, wherein the primitives further include a primitive configured for reading the data and comparing the data to a value.

10. The system of claim 1, wherein the generic decoder is configured to store variable data.

11. The system of claim 1, wherein:
the generic decoder is further configured to indicate that the signature does not apply to the input stream without providing a parse error in response to encountering an unexpected token; and
the analysis engine is configured to generate a second error signal when a character of the first one or more parts matches a predetermined character.

12. The system of claim 1, wherein the generic decoder includes a primitive configured for reading at least a portion of the data and converting the at least a portion of the data to required data types to compare against a threshold.

13. The system of claim 1, wherein the generic decoder is configured for branching through regular expressions.

14. The system of claim 1, wherein the generic decoder is configured for branching through directed parsing.

15. The system of claim 1, wherein the generic decoder is coupled to a pre-developed protocol parser.

16. The system of claim 1, wherein the generic decoder is configured to:
in response to not matching at least a portion of the second one or more parts to the first predetermined pattern, skip the first predetermined number of bytes in the second one or more parts; and
search the second one or more parts for a second predetermined pattern.

17. The system of claim 16, wherein the generic decoder is configured to:
in response to not matching at least a portion of the second one or more parts to the second predetermined pattern, refraining from generating the error signal; and
in response to matching at least a portion of the second one or more parts to the second predetermined pattern, generating the error signal.

18. The system of claim 16, wherein the generic decoder is configured to:
in response to not matching at least a portion of the second one or more parts to the second predetermined pattern, refraining from generating the error signal; and
in response to matching at least a portion of the second one or more parts to the second predetermined pattern storing a second predetermined number of bytes of the second one or more parts in an array,
determining a number of bytes stored in the array, and
generating the error signal in response to the number of bytes stored in the array being greater than a third predetermined number of bytes.

19. The system of claim 1, further comprising a full protocol parser, wherein:
the generic decoder is a first generic decoder;
the intrusion prevention mechanism includes a second generic decoder;
the input stream of data includes a plurality of files;
the plurality of files includes (i) first files in a first one or more formats, and (ii) second files in a second one or more formats;
the full protocol parser parses the plurality of files based on file extensions of the plurality of files, such that
the first generic decoder receives the first files and analyzes a first portion of the data having a first content type, and
the second generic decoder receives the second files and analyzes a second portion of the data having a second content type, wherein the second content type is different than the first content type.

20. A method comprising:
receiving content at an analysis engine;
tokenizing the content into a plurality of parts including first parts and second parts;
analyzing the first parts via the analysis engine;
receiving at a generic decoder the second part the analysis engine, wherein the analysis engine includes one or more protocol parsers, and wherein the generic decoder is configured to operate based on generic application-level protocol analysis language primitives;
analyzing, via the generic decoder, the second parts for a signature including executing code corresponding to
at least one first generic application-level protocol analysis language primitive to skip to a location in the second parts, and
at least one second generic application-level protocol analysis language primitive to match a pattern in the second parts,
wherein the second parts are not analyzed by the analysis engine and have a same protocol as the first parts;
indicating the signature is detected in response to matching the pattern in the second parts; and
indicating the signature does not apply to the second parts in response to encountering a token that does not match the pattern.

21. The method of claim 20, further comprising:
selecting the second parts from the plurality of parts based on whether the second parts have a predetermined file format and corresponding file extension; and
in response to the second parts having the predetermined file format and corresponding file extension, analyzing the second parts via the analysis engine.

22. A system comprising:
one or more processors;
a memory configured to store instructions, which are executable by the one or more processors and include
an analysis engine including one or more protocol parsers and configured to receive data including a first portion and a second portion, wherein the second portion of the data has a same protocol as the first portion of the data, and wherein the analysis engine does not analyze the second portion of the data; and
a generic decoder operating according to primitives, wherein the generic decoder is configured to receive the second portion of the data from the analysis engine, assist the one or more protocol parsers by analyzing the second portion of the data for a signature, output a signal indicating the signature is detected in response to the signature being matched to the second portion of the data; and output a signal indicating the signature does not apply to the second portion of the data in response to encountering a token that does not match the signature.

23. The system of claim 22, wherein the generic decoder is:

coupled to a pre-developed protocol parser providing the second portion of the data to the generic decoder for analysis; and configured to use a syntax that also applies to the pre-developed protocol parser.

\* \* \* \* \*